(12) United States Patent
Reber et al.

(10) Patent No.: US 10,994,626 B2
(45) Date of Patent: May 4, 2021

(54) CHARGING PLUG FOR A CHARGING COLUMN AND CHARGING COLUMN HAVING SUCH A PLUG

(71) Applicant: Dr. Ing. h.c. F. Porsche Aktiengesellschaft, Stuttgart (DE)

(72) Inventors: Volker Reber, Michelbach an der Bilz (DE); Jari Rönfanz, Stuttgart (DE); Michael Kiefer, Stuttgart (DE); Stefan Götz, Forstern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 118 days.

(21) Appl. No.: 16/245,475

(22) Filed: Jan. 11, 2019

(65) Prior Publication Data

US 2019/0217733 A1 Jul. 18, 2019

(30) Foreign Application Priority Data

Jan. 16, 2018 (DE) .......................... 102018100828.7

(51) Int. Cl.

| | |
|---|---|
| *H02J 7/00* | (2006.01) |
| *B60L 53/31* | (2019.01) |
| *B60L 53/16* | (2019.01) |
| *B60L 53/18* | (2019.01) |
| *H01R 13/11* | (2006.01) |
| *H01R 13/42* | (2006.01) |
| *H01R 13/44* | (2006.01) |
| *H01R 13/502* | (2006.01) |
| *H01R 31/06* | (2006.01) |

(52) U.S. Cl.
CPC ............... *B60L 53/31* (2019.02); *B60L 53/16* (2019.02); *B60L 53/18* (2019.02); *H01R 13/111* (2013.01); *H01R 13/42* (2013.01); *H01R 13/44* (2013.01); *H01R 13/502* (2013.01); *H01R 31/06* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 1,685,608 A | | 9/1928 | Lipschutz |
| 6,123,569 A | * | 9/2000 | Fukushima ........... H02J 7/0045 439/456 |
| 9,461,399 B2 | | 10/2016 | Seelig et al. |
| 9,531,103 B2 | | 12/2016 | Fujita et al. |

(Continued)

FOREIGN PATENT DOCUMENTS

| | | |
|---|---|---|
| DE | 19650097 C2 | 4/2002 |
| DE | 102012214685 A1 | 2/2013 |

(Continued)

OTHER PUBLICATIONS

Chinese Office Action for Chinese Application No. 201910026805.6, dated Mar. 4, 2020, 7 pages.

*Primary Examiner* — Arun C Williams
(74) *Attorney, Agent, or Firm* — RatnerPrestia

(57) ABSTRACT

A charging plug for a charging column having a contact carrier and a housing shell. The housing shell has a first duct and a second duct, the first duct and the second duct leading into the contact carrier. The first duct is bent to a greater extent than the second duct. Also described is a corresponding charging column.

8 Claims, 6 Drawing Sheets

(56) References Cited

U.S. PATENT DOCUMENTS

| | | | |
|---|---|---|---|
| 9,570,831 B2* | 2/2017 | Nakai | H01R 13/4226 |
| 9,793,642 B2 | 10/2017 | Natter et al. | |
| 9,843,130 B1 | 12/2017 | Ihde | |
| 2010/0241560 A1* | 9/2010 | Landau-Holdsworth | ............ B60L 53/305 705/39 |
| 2011/0306223 A1* | 12/2011 | Bauer | H01R 13/6397 439/136 |
| 2013/0169226 A1 | 7/2013 | Read | |
| 2013/0337669 A1* | 12/2013 | Najera | B60L 53/16 439/133 |
| 2014/0084678 A1 | 3/2014 | Isaac | |
| 2014/0106586 A1* | 4/2014 | Boeck | H01R 13/701 439/188 |
| 2014/0127924 A1* | 5/2014 | Kim | H01R 13/639 439/299 |
| 2014/0253034 A1* | 9/2014 | Kurimoto | B60L 53/68 320/109 |
| 2014/0347017 A1* | 11/2014 | Sugano | H02J 7/025 320/137 |
| 2014/0357113 A1* | 12/2014 | Fehler | B60L 11/1818 439/367 |
| 2015/0097090 A1* | 4/2015 | Musick | B60L 53/305 248/74.3 |
| 2015/0139761 A1* | 5/2015 | Qi | H01R 13/6315 414/253 |
| 2015/0295355 A1* | 10/2015 | Temmesfeld | B60L 53/16 439/304 |
| 2016/0121747 A1* | 5/2016 | Jefferies | H02G 3/0493 320/109 |
| 2016/0288658 A1* | 10/2016 | Rudolph | B60L 3/0046 |
| 2017/0028862 A1* | 2/2017 | Nagel | B60L 53/18 |
| 2018/0075946 A1* | 3/2018 | Beimdieck | B60L 53/18 |
| 2018/0264957 A1* | 9/2018 | Fuehrer | B60L 53/16 |
| 2018/0269619 A1 | 9/2018 | Beimdieck et al. | |
| 2019/0074620 A1* | 3/2019 | Moseke | H01R 13/533 |

FOREIGN PATENT DOCUMENTS

| | | |
|---|---|---|
| DE | 102013007330 A1 | 10/2014 |
| DE | 102013019882 A1 | 5/2015 |
| DE | 112014004814 T5 | 7/2015 |
| DE | 112014002324 T5 | 1/2016 |
| DE | 102016206300 A1 | 10/2017 |
| EP | 3043421 A1 | 7/2016 |
| WO | 2017198798 A1 | 11/2017 |

\* cited by examiner

CHARGING PLUG FOR A CHARGING COLUMN AND CHARGING COLUMN HAVING SUCH A PLUG

CROSS-REFERENCE TO RELATED APPLICATION

This application claims priority to German Patent Application No. DE 10 2018 100 828.7, filed Jan. 16, 2018, which is incorporated by reference herein in its entirety.

FIELD OF THE INVENTION

The present invention relates to a charging plug for a charging column. The present invention also relates to a corresponding charging column.

BACKGROUND OF THE INVENTION

In electrical engineering, any stationary device or electrical system which serves for supplying energy to mobile, battery-operated units, machines or motor vehicles by way of simple setting or insertion without it being necessary for the energy storage device—for example the traction battery of an electric automobile—to be removed is referred to as a charging station. Charging stations for electric automobiles are also referred to colloquially as "electric filling stations" and may comprise multiple charging points which, depending on the type of construction, are characterized as "charging columns".

Known here in particular are fast charging/high-performance charging (HPC) systems based on direct current (DC) such as the so-called combined charging system (CCS), which is widespread in Europe. In the case of direct-current charging of the generic type, direct current is fed from the charging column directly into the vehicle and, for this purpose, is provided by way of a powerful rectifier from the power supply system or by way of large buffer accumulators at solar charging stations. Situated in the vehicle is a battery management system which communicates with the charging column in order to adapt the current intensity, or to terminate the process when a capacity limit is reached.

According to the prior art, the power electronics required for this purpose are normally integrated in the charging column and able to be loaded up to a power limit of 50 kW.

Since the direct-current connections of the charging column are connected directly to corresponding connections of the traction battery, it is thus possible for high charging currents to be transmitted with little loss, this allowing short charging times but also placing high demands on the charging plug.

Particularly in the case of high charging currents of more than 250 A, the necessary cables and copper conductors are very thick, inflexible and have the minimum possible bending radii. For this reason, charging plugs of the generic type are usually very unwieldy. Although the plug is plugged virtually horizontally and the cable tends to fall to the ground perpendicularly on account of the weight thereof, known plugs usually have a very limited outlet angle of the cable: either the angle is steep but with the consequence that the plug is large, unwieldy and difficult to hold in order to make possible the bending radius with respect to the plug, or the plug is delicate and convenient—with too narrow an angle.

DE112014002324T5, which is incorporated by reference herein, discloses a holding structure for a connection part. A shielded cable, which is led out of a connection receiving chamber, is bent at a right angle here by the application of a protective covering to a shielding plate and then led out via a wire outlet opening section. A rubber cap is installed in the wire outlet opening section and the shielded cable passes through an interior of the rubber cap, as a result of which the shielded cable is prevented from being bent to too great an extent.

DE19650097C2, which is incorporated by reference herein, relates to a charging plug for an electric automobile having feed lines and two line securing pins. Since said line securing pins press onto the feed lines from opposite directions, said feed lines are themselves secured in a bent state, and when tensile stress acts on the cable, the friction resistance offsets the arising tensile stress.

DE102013019882A1, which is incorporated by reference herein, finally discusses charging cables that provide a charging cable plug on the end side and are embodied with different line cross sections. This results in the outer diameters of the charging cables varying to a great extent. In order to ensure a defined guidance of the charging cable from the charging cable plug, the contour of the charging cable plug and, in particular, the charging cable connection opening provided on the plug housing are adjusted to the respective outer diameter.

SUMMARY OF THE INVENTION

One advantage of the proposed plug is the particular handiness thereof. In accordance with aspects of the invention, the individual conductors of the charging plug such as the power cable, signal cable and protective conductor (protective earth, PE) are divided into at least two bundles for this purpose: one bundle is preferably formed by those conductors having a high bending radius; a further bundle is formed exclusively from conductors having sufficient flexibility.

The plug contains at least two guides or tunnels, via which the conductors are guided from the pin part to the cable. The tunnel of the particularly inflexible conductors is guided with a relatively high bending radius. Some of the more flexible conductors can be concomitantly guided here; however, they predominantly run through a further duct, which has more pronounced bends.

An opening may be provided in the center. Two relatively thin segments, which can be used very easily as a handle, are produced as a result.

In the case of CCS plugs, the DC conductors that can carry particularly high currents are arranged practically beneath the signal and control lines so that the duct having the greater bending radius can lie at the bottom and no crossing of conductors is required. If the power contacts in other plug types should be arranged above the signal and control lines, there may, however, be a crossing present in which the power cables are preferably guided on the shortest path and the flexible lines are placed around the power conductors in such a way that they likewise reach their duct.

For a universal plug design, the actual plug part can be configured as an interchangeable part in order to be able to form country variants in combination with similar basic modules by simply interchanging the actual plug part.

BRIEF DESCRIPTION OF THE DRAWING

One exemplary embodiment of the invention is illustrated in the drawings and will be described in more detail below. In the drawings.

DETAILED DESCRIPTION OF THE INVENTION

Figure 1:
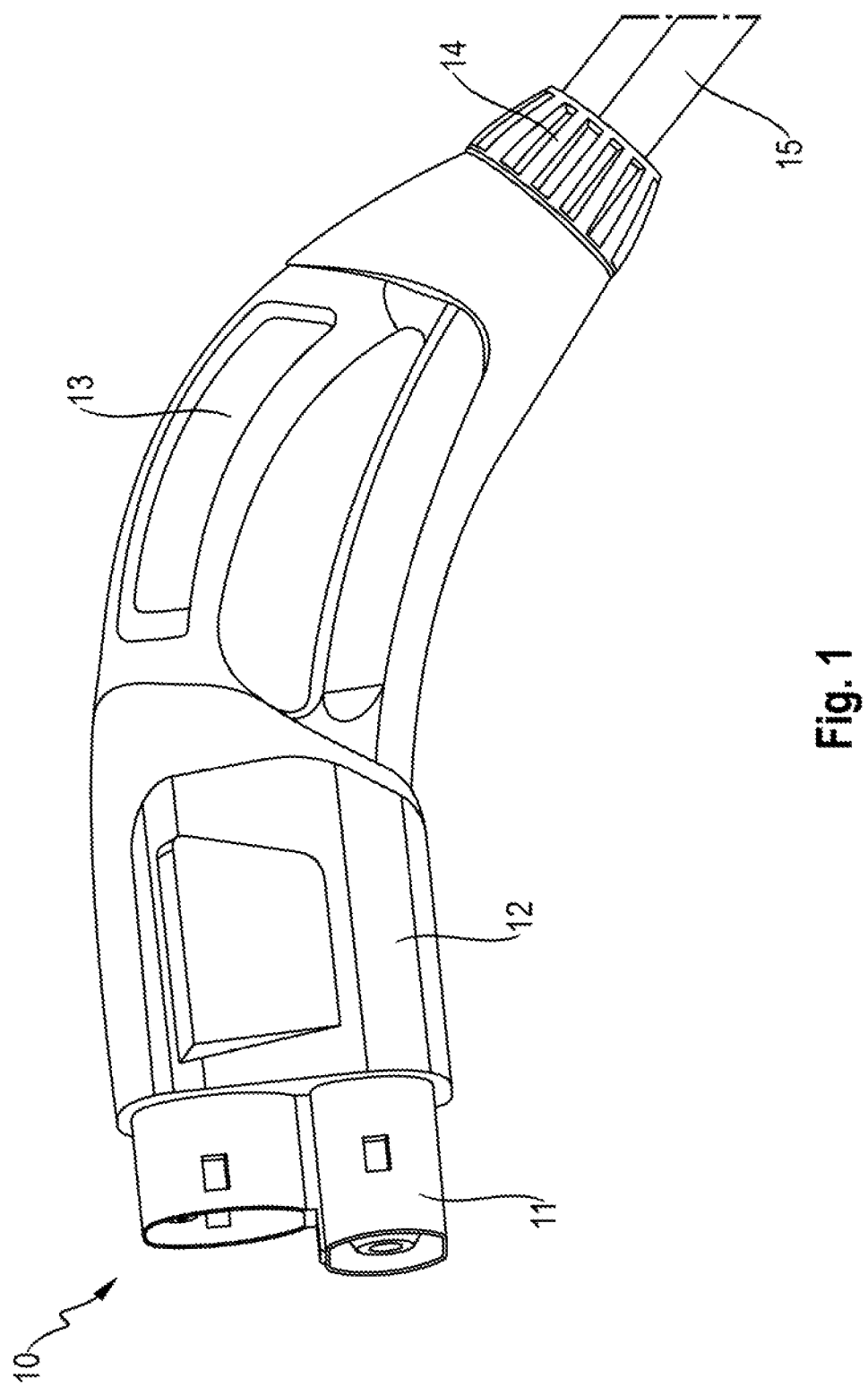
FIG. 1 shows the perspective view of a first DC charging plug.
Figure 2:
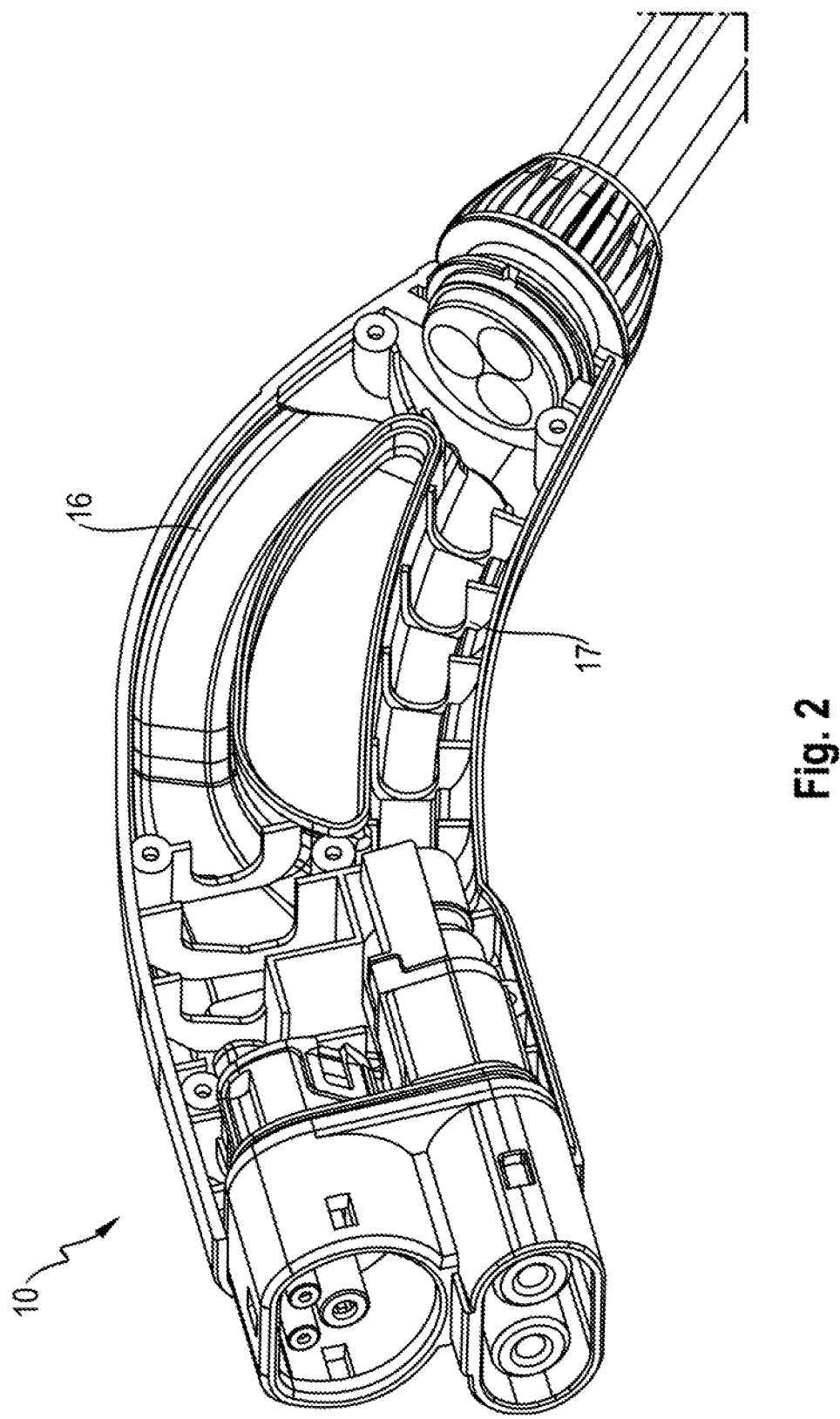
FIG. 2 shows a partial section of the first DC charging plug.

FIG. 1 illustrates the basic construction of a charging plug (10) for the charging column—not illustrated in its entirety in the figure—of an electric filling station. In an initially substantially conventional arrangement, the charging plug (10) has a contact carrier (11) embodied as an insulating body, a two-part housing shell (12) having a handle region (13) facing away from the contact carrier (11), and a cable (15) leading into the housing shell (12) via a cable receptacle (14). Already the opening (in accordance with the drawing) of the charging plug (10) between the particularly narrowly shaped handle region (13) and a further segment, however, allows two separate line ducts to be surmised, which ducts are now explained on the basis of the partial section of FIG. 2.

Figure 3:
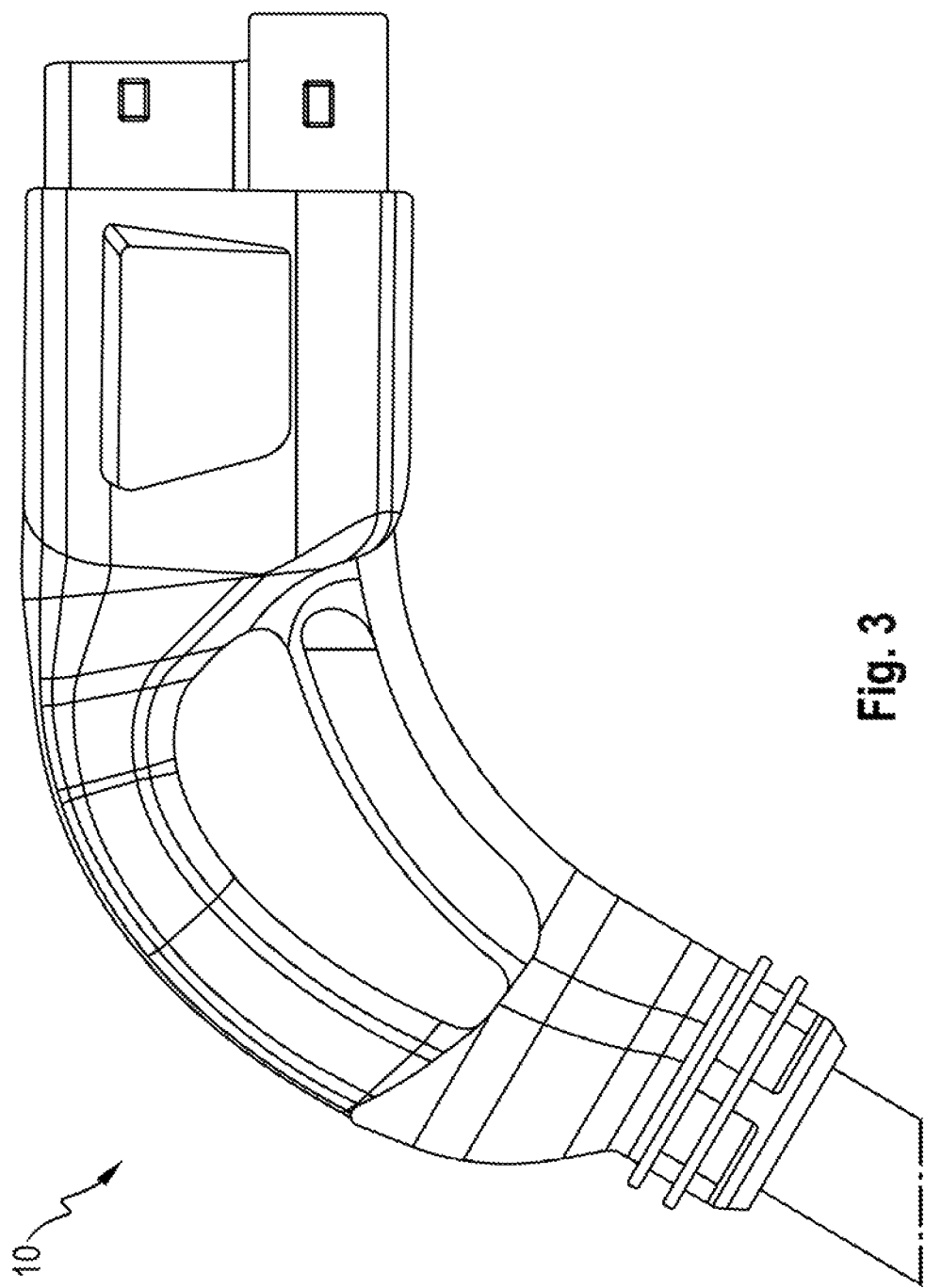
FIG. 3 shows the side view of a second DC charging plug.

In this case, a first significantly bent duct for flexible lines that passes through the handle region (13) as well as a merely gently curved second duct (17)—for receiving inflexible power conductors having a high bending radius—of the housing shell (12) can be seen, said two ducts leading into the contact carrier (11). As, in particular, FIG. 3 illustrates, said duct guidance also makes a significantly greater curvature of the entire charging plug (10) possible despite high cable cross sections, which in turn permits a steeper outlet angle of the cable (15) overall.

Figure 4:
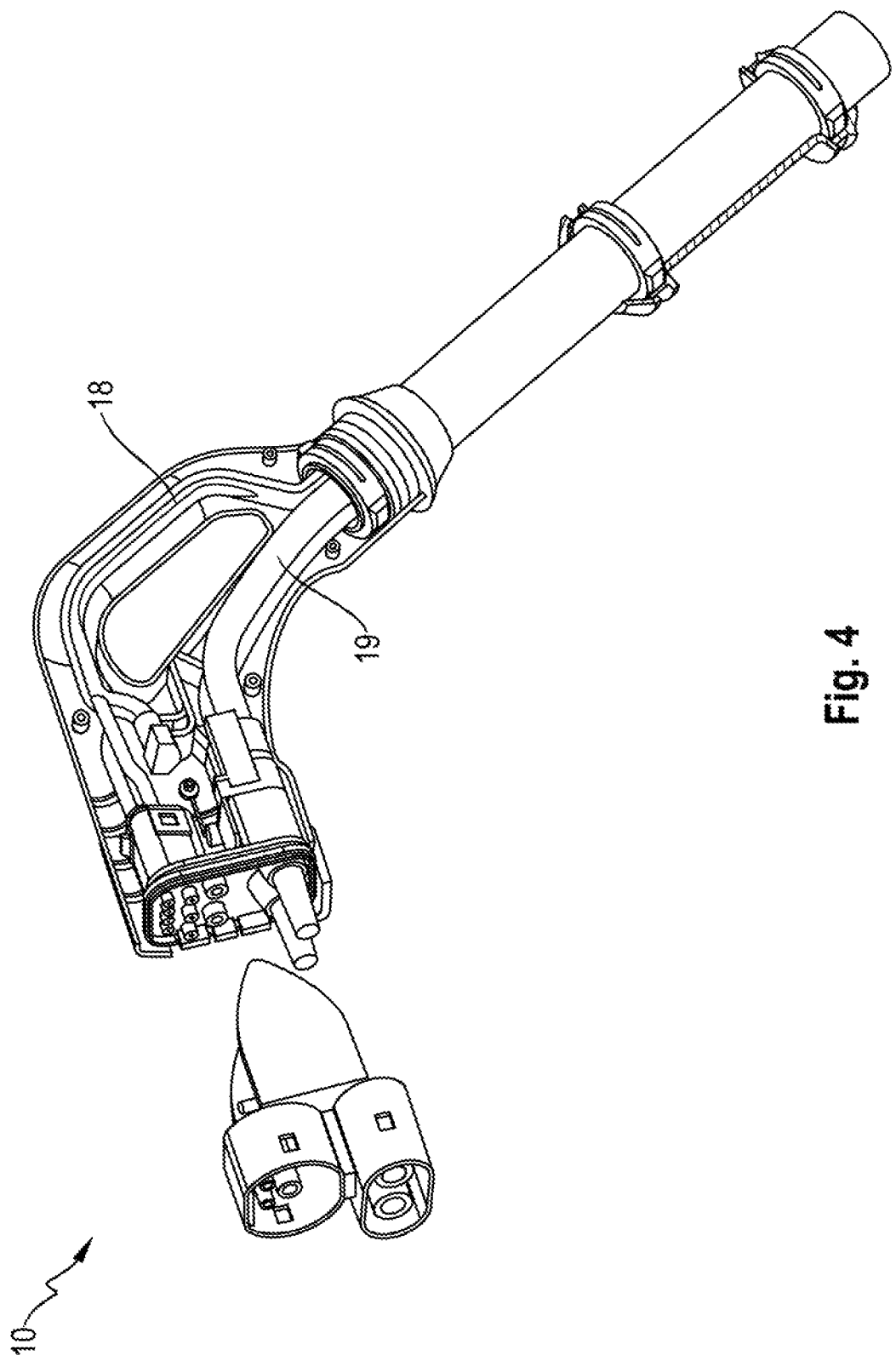
FIG. 4 shows a first partial section of the second DC charging plug.

FIG. 4 presents a conceivable profile of the control and protective lines (18) and DC lines (19) of the cable (15) through the first duct (16) and second duct (17), respectively, of the housing shell (12). While the control and protective lines (18) generally have a line cross section of less than 25 mm$^2$, the cross section of the DC lines (19) is sometimes significantly greater. In the case of the DC lines (19), the possible cooling and insulation thereof, which may also sometimes significantly increase the overall cross section and rigidity thereof, are also taken into consideration.

Figure 5:
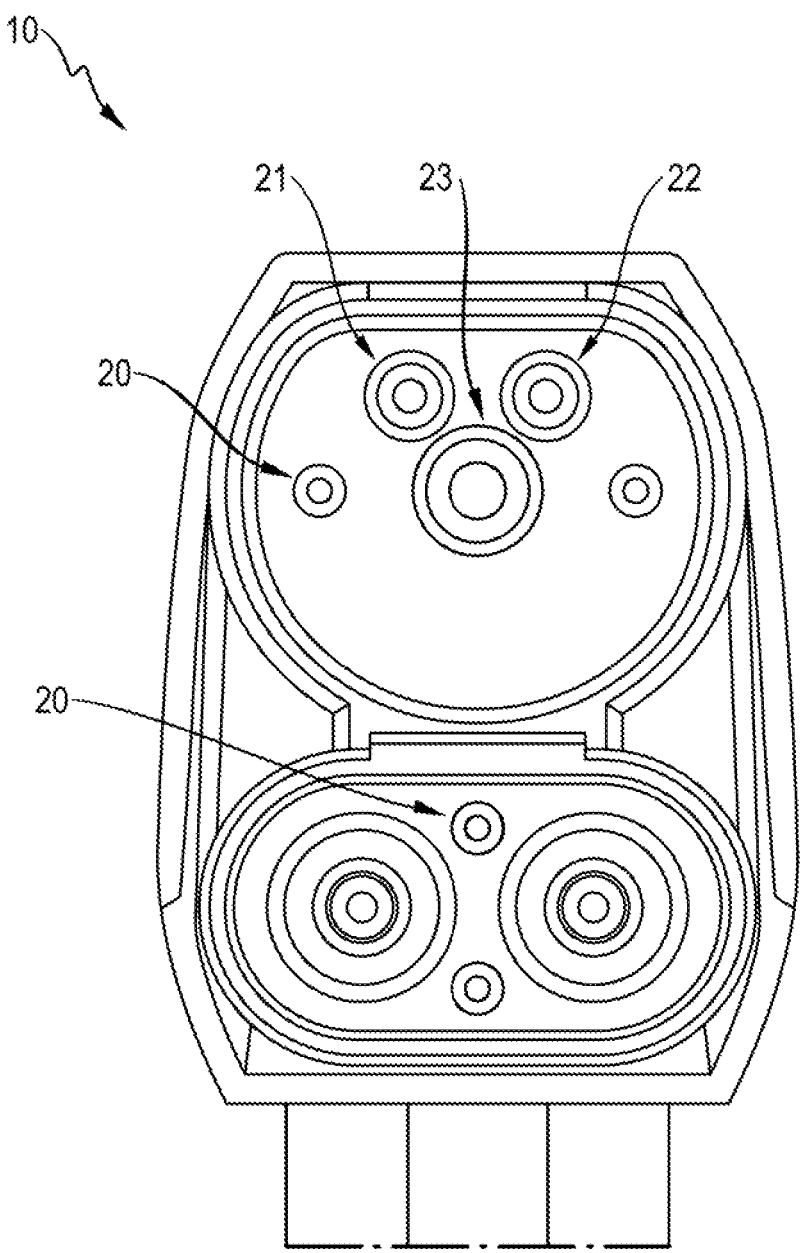
FIG. 5 shows a plan view of the second DC charging plug.

The connection assignment of the charging plug (10), which in the present case corresponds to Type 2, is documented in FIG. 5. In this case, a first signal conductor (21) for the control pilot contact (CP), a second signal conductor (22) for the proximity pilot contact (PP) and a protective conductor (23) likewise leading into the contact carrier (11) are provided as the control and protective lines (18). The configuration illustrated shows the charging plug (10) in this case without a contact carrier (11) when fully mounted; said contact carrier can then be fastened—in the present case by a screw joint (20) at four points arranged in a Y-shape—to the housing shell (12) with a low level of mounting outlay.

Figure 6:
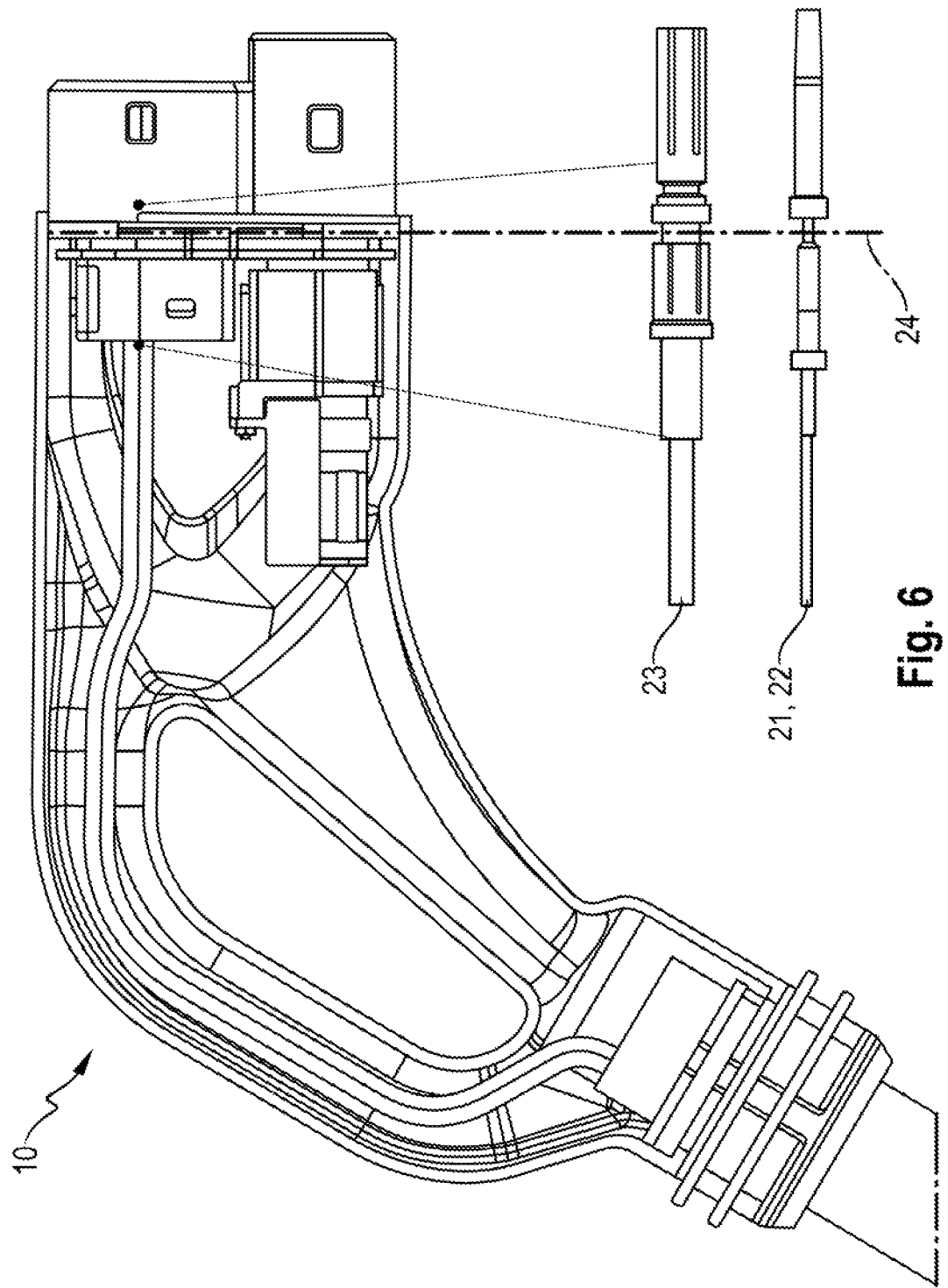
FIG. 6 shows a second partial section of the second charging plug.

FIG. 6 shows the profile of the separating plane (24) defined in this way between the contact carrier (11) and the housing shell (12): for example, the possible contact separation when the contact carrier (11) is removed is thus illustrated with reference to is the protective conductor (23).

What is claimed is:

1. A charging plug for a charging column, comprising:
a contact carrier and a housing shell,
the housing shell having a first duct and a second duct,
wherein the first duct and the second duct lead into the contact carrier and the first duct is bent to a greater extent than the second duct,
wherein the charging plug comprises a cable receptacle and a cable and the cable leads into the housing shell via the cable receptacle, and
wherein the cable comprises control and protective lines and DC lines, wherein the control and protective lines run through the first duct and the DC lines run through the second duct.

2. The charging plug as claimed in claim 1, wherein the charging plug has a handle region and the first duct passes through the handle region.

3. The charging plug as claimed in claim 1, wherein the control and protective lines comprise a control pilot signal conductor and the control pilot signal conductor leads into the contact carrier.

4. The charging plug as claimed in claim 1, wherein the control and protective lines comprise a proximity pilot signal conductor and the proximity pilot signal conductor leads into the contact carrier.

5. The charging plug as claimed in claim 1, wherein the control and protective lines comprise a protective conductor and the protective conductor leads into the contact carrier.

6. The charging plug as claimed in claim 1, wherein the control and protective lines are separable in a common separating plane that runs between the contact carrier and the housing shell.

7. A charging column having the charging plug as claimed in claim 1.

8. The charging plug as claimed in claim 1, wherein the charging plug has a screw joint and the screw joint connects the contact carrier to the housing shell.

* * * * *